United States Patent [19]

Koehler

[11] 4,197,747

[45] Apr. 15, 1980

[54] UNDERWATER INSTRUMENT CASE

[76] Inventor: Carlton L. Koehler, Box 236, Avalon, Calif. 90704

[21] Appl. No.: 493,784

[22] Filed: Aug. 1, 1974

Related U.S. Application Data

[63] Continuation-in-part of Ser. No. 348,033, Apr. 5, 1973, abandoned.

[51] Int. Cl.² .................... G01D 11/26; G01L 19/14; G01P 1/02
[52] U.S. Cl. .................................. 73/431; 368/286; 224/4 A
[58] Field of Search ............ 58/152 R, 152 C; 61/70; 73/300, 431, 714; 220/1 R, 20; 224/4 A; 248/114–116; 206/315; 128/142, 142.4

[56] References Cited

U.S. PATENT DOCUMENTS

| | | | |
|---|---|---|---|
| 1,232,237 | 7/1917 | Depollier | 248/116 |
| 2,166,687 | 7/1939 | Kehl | 58/152 R |
| 2,719,403 | 10/1955 | Gisiger | 73/431 |
| 2,773,388 | 12/1956 | Prosser | 73/431 |
| 3,026,072 | 3/1962 | Hughes | 73/431 X |
| 3,724,277 | 4/1973 | Parmentier | 73/431 |
| 3,828,611 | 8/1974 | Shamlian et al. | 73/431 X |
| 3,861,417 | 1/1975 | Rowe | 128/142.4 X |
| 3,888,127 | 6/1975 | Shamlian et al. | 73/431 |

Primary Examiner—Herbert F. Ross
Attorney, Agent, or Firm—Fulwider, Patton, Rieber, Lee & Utecht

[57] ABSTRACT

An underwater diver's instrument case for tethering an underwater watch and depth gauge to a pressure gauge suspended from a hose leading from a regulator mounted on a scuba tank. The case includes a housing formed with a compartment defining pressure gauge and depth gauge cavities. The housing includes a retainer which retains the pressure and depth gauges in their respective cavities. The cover is formed with windows overlying the faces of the respective gauges to enable viewing thereof. Thus, the case may be conveniently mounted to a pressure gauge conventionally suspended from a scuba diver's air regulator by means of a hose and the depth gauge will be readily available for convenient viewing during a dive much the same as the pressure gauge.

14 Claims, 5 Drawing Figures

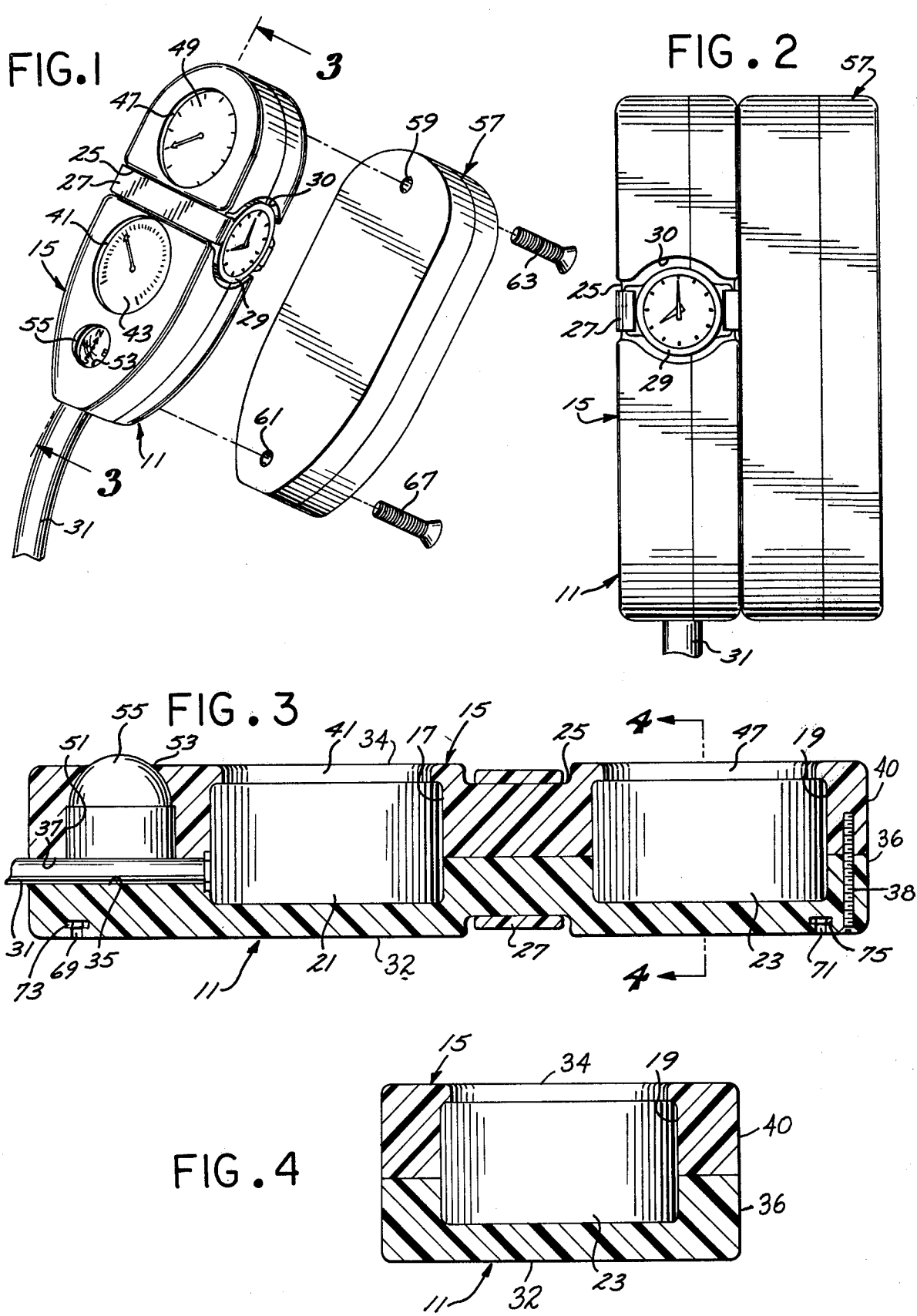

UNDERWATER INSTRUMENT CASE

CROSS-REFERENCE TO RELATED APPLICATION

The present application is a continuation-in-part of U.S. Ser. No. 348,033, filed Apr. 5, 1973, for UNDERWATER INSTRUMENT CASE now abandoned. The benefit of the earlier filing date is claimed for the subject matter common to both applications.

BACKGROUND OF THE INVENTION

1. Field of the Invention

The instrument case of the present invention relates to a device for securement to a pressure gauge carried from a sensing hose leading from a scuba diver's regulator and which removably mounts a depth gauge for viewing during an underwater dive.

2. Description of the Prior Art

Heretofore it has been common practice for an underwater diver, such as a scuba diver, to carry air tanks from his back and such tanks normally have a regulator mounted thereon with a hose extending therefrom to have a pressure gauge carried from the end thereof whereby the diver can monitor the pressure in the tanks during his dive. Other instruments, such as depth gauges, watches, compasses and decompression computers are normally carried separately from the depth gauge and considerable time is consumed in strapping or otherwise attaching such instruments to the person of the diver prior to a dive. The inconvenience of donning all such instruments separately for each dive is particularly irritating to professional divers who make frequent dives, thus resulting in consumption of considerable time in securing all the various instruments to his person for each dive.

SUMMARY OF THE INVENTION

The underwater instrument case of the present invention is characterized by a housing including front and rear walls formed with a central compartment divided into pressure and depth gauge cavities for removable receipt of respective pressure and depth gauges. Retaining means is provided for holding the pressure and depth gauges in position and hose passage means project from the pressure gauge cavity for passage therethrough of a hose leading to a scuba diver's air tank and to which the pressure gauge is tethered.

The objects and advantages of the present invention will become apparent from a consideration of the following detailed description when taken in conjunction with the accompanying drawings.

BRIEF DESCRIPTION OF THE DRAWINGS

FIG. 1 is a perspective view of an underwater instrument case embodying the present invention;

FIG. 2 is a side view of the instrument case shown in FIG. 1;

FIG. 3 is a longitudinal sectional view taken along the line 3—3 of FIG. 1;

FIG. 4 is a transverse sectional view taken along the line 4—4 of FIG. 3; and

DESCRIPTION OF THE PREFERRED EMBODIMENT

Figure 5:
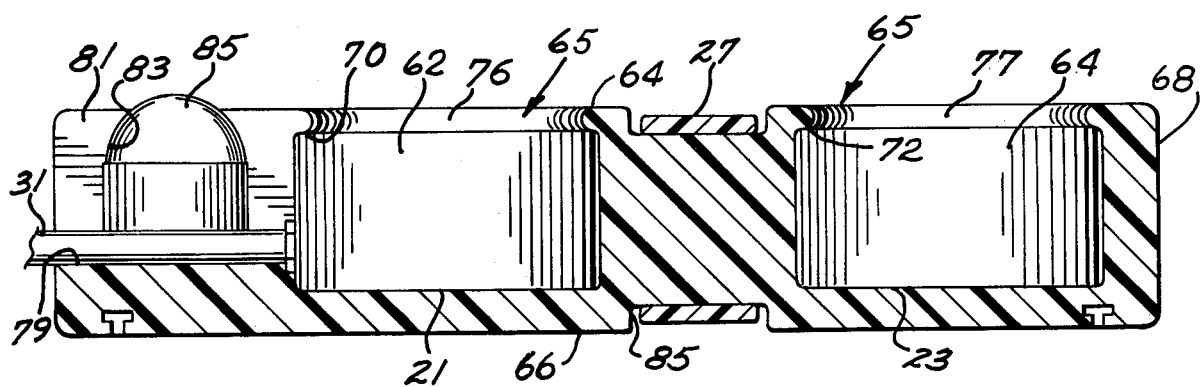
FIG. 5 is a longitudinal sectional view through a second embodiment of the underwater instrument case of the present invention.

Referring to FIG. 1, the underwater instrument case of the present invention includes, generally, a housing 11 having a cover 15 disposed thereover and cooperating with such housing to form an interior compartment defining a pair of cylindrical interior cavities 17 and 19 separated by a retaining partition for removable receipt of an underwater diver's pressure gauge 21 and depth gauge 23, respectively. The exterior of the case is conveniently formed centrally with a necked-down portion defining a peripheral channel 25 for receipt of the band 27 of the diver's wristwatch 29 to mount such watch from the case, such channel being formed with an enlarged recess 30 for receipt of the watch. Consequently, the case itself may conveniently be secured to the pressure gauge 21 which is tethered to the diver's regulator by means of a hose 31 and all three instruments mounted therefrom will be readily available for viewing by the diver during his dive.

In the embodiment shown in FIGS. 1 and 3, the housing 11 and cover 15 are constructed separately and are preferably contructed of a tough plastic. Conveniently, the housing 11 and cover 15 are formed with respective one piece back and front walls 32 and 34 which have respective peripheral skirts 36 and 40 formed integral therewith. Such peripheral skirts 36 and 40 abut one another on their inner edges to form a joint along the plane of the diameter of the sensing hose 31 leading from the pressure gauge 21 thereby providing an arrangement where one diametrical half 35 of the bore accommodating egress of such hose 31 is formed in the housing skirt 36 and the other diametrical half 37 is formed in the cover 15. The housing 11 and cover 15 conveniently cooperate to form the cavities 17 and 19 separate from one another and are connected together by means of fastening screws 38. Obviously, if desirable the cavities 17 and 19 could be formed in one continuous compartment and the gauges 21 and 23 (FIG. 3) merely held frictionally in position or maintained stationary in the housing by means of a partial partition, receiving recess, or the like. Similarly, the base portion of the pressure gauge cavity 17 is formed in the housing 11 and the upper portion thereof is formed in the cover 15, such cover being formed with a circular peripheral retaining lip 41 projecting radially inwardly from the cylindrical wall of such cavity 17 to retain the pressure gauge 21 in position. The retaining lip 41 forms a window 43 overlying the face of the pressure gauge 21 to enable convenient viewing of such pressure gauge.

In a similar manner, the base portion of the depth gauge cavity 19 is formed in the housing 11 and the upper portion thereof is formed in the cover, 15, such cover being formed with a retaining lip 47 projecting radially inwardly a short distance from the wall of such cavity 19 and terminating in an aperture defining a window 49 overlying the face of the depth gauge 23 to enable convenient viewing thereof.

It is noted that the case shown in the preferred embodiment is somewhat oval in plan view to form a streamlined body to avoid catching in crevices and the like and is formed centrally with a peripheral groove defining the waist 25 which receives the wristwatch band 27.

Referring to FIG. 3, an upwardly projecting circular opening 51 is formed in the housing in the cover 15 and tapers inwardly and upwardly in somewhat of a dome shape to form a reduced-in-diameter window 53 whereby a conventional compact compass 55 may be received in such opening 51 and the face thereof may be viewed through the aperture 53.

For longer dives, it is necessary for the diver to keep track of his depth and time spent at each particular depth in order to time his assent to provide for proper decompression in order to avoid an affliction normally termed the "bends". During such longer term dives, it is desirable to carry a decompression computer in an auxiliary housing, generally designated 57. I have provided decompression computer case 57 with a pair of through bores 59 and 61 which receive respective fastening screws 63 and 67 which lead through and project into respective bores 69 and 71 (FIG. 3) formed in the backside of the housing 11. Embedded within such bores 69 and 71 are respective internally threaded nuts 73 and 75 into which the ends of the retaining screws 63 and 67 are screwed to secure such decompression computer 57 to the housing 11.

In operation, the housing 11 is fitted onto the backside of the pressure gauge 21 and the pressure gauge hose 31 disposed within the passage 35. The depth gauge 23 is then positioned within such housing 11 and the compass 55 is fitted in the opening 51. The cover 15 is then positioned over the pressure gauge 21 and depth gauge 23, fastened thereto by means of the screw 38. The watch 29 is then positioned in the enlarged recess 30 and the band 27 stretched about the waist 25 and buckled to hold such watch on the case. The diver is then ready for his dive and during descent he can conveniently grasp the case and periodically view the depth gauge 23 and observe the face of the watch 29 to determine his rate of descent. Further, the diver will want to periodically monitor the pressure in his air tank by viewing the pressure gauge 21.

During his underwater stay, the diver may move about from place to place and his duties may involve various maneuvers resulting in his losing his orientation thus necessitating reference to the compass 55. At any time the diver's hands are occupied, the entire case and instruments mounted therefrom can be left suspended from the pressure sensing hose 31 but will always be readily available when reference is to be made thereto. The watch 29, being recessed within the recess 30, is protected from bumping against rocks and other underwater obstacles.

After ascent from the dive, the diver may remove his diving paraphernalia and the subject gauges may be left in the case of the present invention and will be ready for a subsequent dive with the diver being required only to mount his regulator or his air tanks eliminating all the time that would otherwise be required for securing the depth gauge 23, watch 29, and compass 55 to various parts of his person.

If the diver contemplates an extended dive, he can easily mount the decompression computer case 57 from the housing 11 by merely inserting the screws 63 and 67 in the respective bores 59 and 61 and projecting the threaded extremities thereof into the respective nuts 73 and 75 and screwing such screws firmly into position to mount the computer in place. Such computer will then be available during ascent from such dive to enable the diver to determine a safe ascent rate.

The diver's instrument case shown in FIG. 5 is substantially the same as that shown in FIG. 1 except such case is of unitary construction and includes a housing or case 65 constructed of generally resilient material, preferably rubber, and including respective front and back walls 64 and 66 joined together about their peripheries by a peripheral skirt 68 formed integrally therewith. Such housing 65 is formed with the pressure and depth gauge cavities 62 and 64 which are formed on their upper extremities with radially inwardly projecting flexible lips 70 and 72, respectively. The lips 71 and 73 terminate in apertures defining respective windows 76 and 77 overlying the faces of the respective pressure and depth gauges. Leading from the pressure gauge cavity 67 is a bore 79 for receipt of the pressure sensing hose 31 and projecting upwardly from such bore is an elongated slot 81 which has a generally cylindrically shaped cavity 83 formed centrally therein for receipt of a compact compass 85. The exterior of the case 65 is shaped similar to the case shown in FIG. 1 and is formed centrally with a waist portion 85 for receipt of the wristwatch band 27.

In operation, the case 65 is utilized similar to the manner described hereinabove for the case shown in FIG. 1 and the pressure gauge 21 may be installed therein by spreading the case apart along the slot 81 to insert the hose 31 in the bore 79 and the peripheral lip 70 is stretched to enable insertion of the gauge 21 in the cavity 62, such lip then snapping back into place to hold the gauge 21 in position. In a similar manner, the depth gauge 23 may be installed in the depth gauge cavity 64 by stretching the retaining lip 77 for receipt thereof. The compass 85 may be installed by spreading the case apart along the slot 81 and inserting such compass in the cavity 83.

From the foregoing it will be apparent that the instrument case of the present invention provides an economical and convenient means for housing and protecting various instruments required by a diver in a convenient compact arrangement which can be rapidly attached to the diver before his dive and can be rapidly removed therefrom upon his return to the water's surface.

Various modifications and changes may be made with regard to the foregoing detailed description without departing from the spirit of the invention.

I claim:

1. An underwater instrument case for securing depth and discrete, individually sealed pressure gauges tethered to an air hose leading from a scuba diver's air tank and comprising:

a housing including spaced apart back and front walls formed with an interior compartment defining a pressure gauge receiving cavity and an interior compartment defining depth gauge receiving cavity, said front wall overlying said cavities and adapted to cooperate therewith to removably retain said pressure and depth gauges in said respective cavities and formed with windows overlying the faces of said respective gauges;

partition means completely separating said cavities;

retaining means in said housing for retaining said pressure and depth gauges in said respective cavities; and, means forming a hose passage leading from said pressure gauge cavity to the exterior of said case whereby said pressure and depth gauges may be positioned in said respective cavities with said hose leading out said passage to retain said gauges mounted from said case for convenient viewing during underwater dives.

2. An underwater instrument case according to claim 1 that includes:

mounting means on said housing for mounting a decompression computer thereto.

3. An underwater instrument case according to claim 1 for carrying a compact compass and wherein:
said cover is formed with a compass cavity for receiving said compass, said compass cavity terminating at the outer surface of said housing in a reduced-in-cross section compass window.

4. An underwater instrument case according to claim 1 for mounting a wrist watch and wherein:
said housing includes exterior watch mounting means in the form of a necked-down portion to form a wristband receiving waist for receipt of the wristband of said wrist watch.

5. An underwater instrument case according to claim 1 wherein:
said front wall includes resilient lips surrounding the sides of said pressure and depth gauge receiving cavities and projecting inwardly to terminate in edges forming said respective windows, said lips having sufficient flexibility to be stretched to open said windows sufficiently to receive said respective gauges therethrough for disposition and retention in said respective cavity.

6. An underwater instrument case according to claim 1 for mounting a wrist watch and wherein:
said front and back walls are formed separately and are formed exteriorly with a necked-down portion defining a wristband receiving waist for receipt of the band of said wrist watch to fasten said housing and cover means together.

7. An underwater instrument case according to claim 6 wherein:
said waist extends entirely around said carrier and is formed with an enlarged recess for receipt of said wrist watch.

8. An underwater instrument case according to claim 1 that includes:
auxiliary mounting means for mounting an auxiliary case therefrom.

9. An underwater instrument case according to claim 8 wherein:
said auxiliary mounting means is in the form of means for mounting a decompression computer to said housing.

10. An underwater instrument case for securing and sealing a depth gauge of predetermined configuration from a discrete pressure gauge of a selected configuration and tethered to an air hose leading from a scuba diver's air tank and comprising:
a housing including a one piece integral back wall and a one piece front wall spaced from said back wall, peripheral skirt means projecting between said front and back walls and cooperating therewith to form an interior compartment pressure gauge-receiving cavity of said predetermined configuration for complimentally receiving said pressure gauge and to form an interior compartment depth gauge receiving cavity of said selected configuration for complimentally receiving said depth gauge, partition means completely separating said cavities, said front wall overlying said cavities and adapted to cooperate therewith to retain said pressure and depth gauges in said respective cavities and formed with windows overlying the faces of said respective gauges;
releasable retaining means for releasably retaining said pressure and depth gauges in said respective cavities; and,
means forming a hose passage leading from said pressure gauge cavity to the exterior of said case whereby said releasable retaining means may be released, said pressure and depth gauges positioned in said respective cavities with said hose leading out said passage to tether said gauges to said hose for convenient viewing during underwater dives.

11. An underwater instrument case for securing a depth gauge of a predetermined exterior configuration from a discrete pressure gauge, of a selected exterior configuration for tethering to an air hose leading from a scuba diver's air tank and comprising:
a housing including spaced apart substantially co-planar back and front walls, peripheral skirt means molded integral with at least one of said walls and extending around the periphery of said housing and cooperating with said front and back walls to form an interior pressure gauge-receiving cavity of said selected configuration and depth gauge receiving cavity of said predetermined configuration, said housing further including an intermediate partition completely separating said cavities from one another, at least one of said walls overlying each said cavities and adapted to cooperate therewith to retain said pressure and depth gauges in said respective cavities and being formed with windows overlying the faces of said respective gauges;
retaining lips bordering said windows for retaining said pressure and depth gauges in said respective cavities; and,
means forming a hose passage leading from said pressure gauge cavity to the exterior of said case whereby said pressure and depth gauges may be positioned in said respective cavities with said hose leading out said passage to retain said gauges mounted from said case for convenient viewing during underwater dives.

12. An underwater instrument case according to claim 11 wherein:
said retaining means includes resilient lips formed in said front wall and projecting inwardly over the marginal edges of said cavities to border said windows and having sufficient flexibility to be stretched and enlarged for receipt through said windows of said respective gauges.

13. An underwater instrument case according to claim 11 wherein:
said front and back walls and skirt are formed integral with one another.

14. An underwater instrument case according to claim 11 wherein:
said housing is formed with front and back portions incorporating said respective front and back walls and wherein said front and back walls are integral in themselves and said skirt means includes front and back skirts formed integral with said respective front and back walls and projecting inwardly therefrom to contact one another along a juncture intermediate said front and back walls; and,
said retaining means includes screw means interconnecting said front and back portions.

* * * * *